Nov. 24, 1942.    A. J. CHERRY    2,302,675
SELF-TAPPING SCREW
Filed Sept. 8, 1938
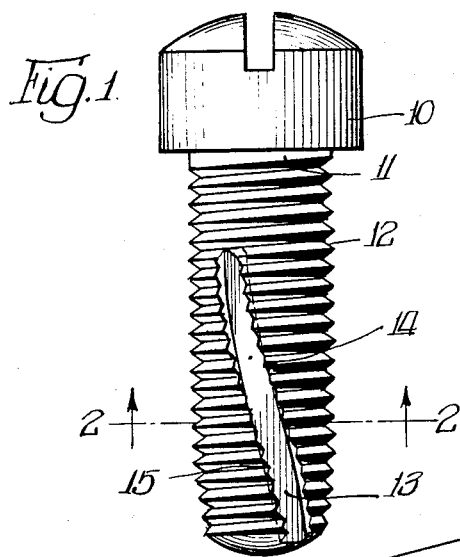
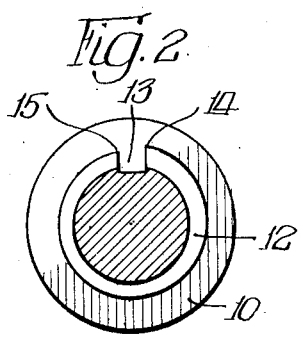
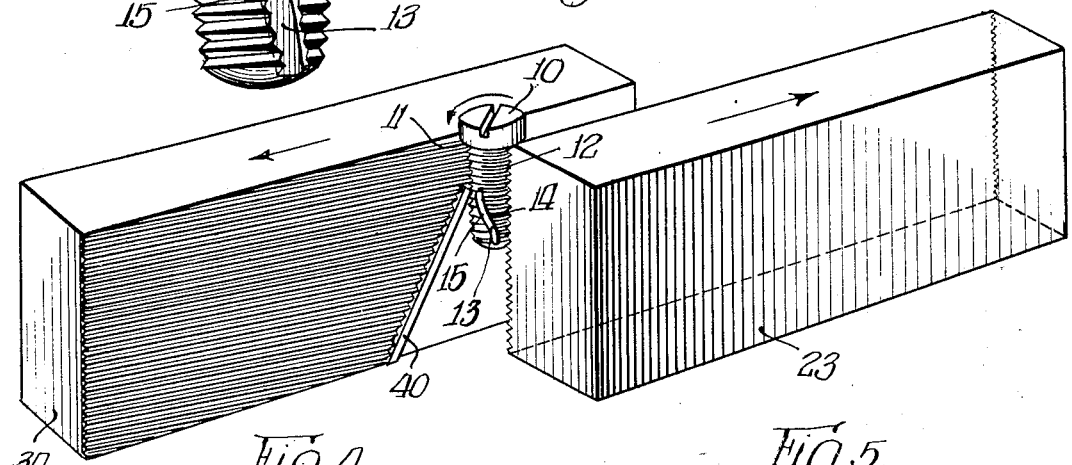
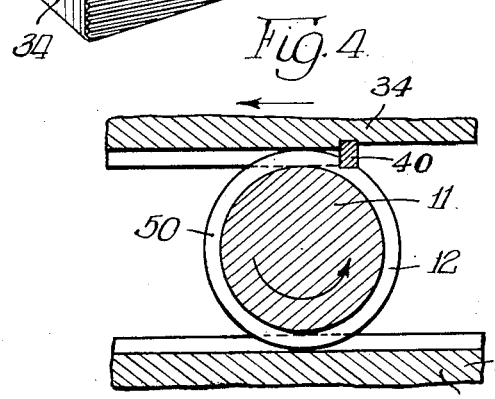
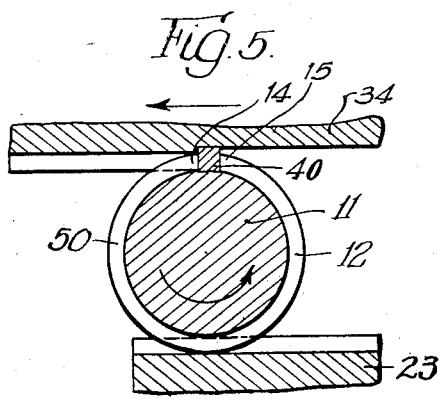
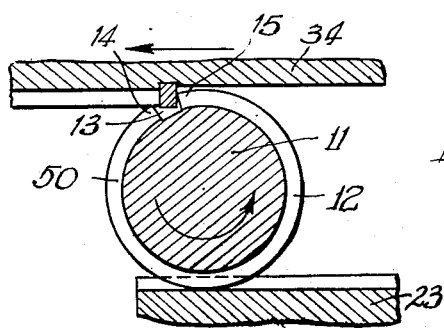
INVENTOR.
Andrew J. Cherry,
BY
Wilkinson, Huxley, Byron & Knight
ATTYS.

Patented Nov. 24, 1942

2,302,675

UNITED STATES PATENT OFFICE 2,302,675

SELF-TAPPING SCREW

Andrew J. Cherry, Chicago, Ill., assignor to Economy Screw Corporation, Chicago, Ill., a corporation of Illinois Application September 5, 1938, Serial No. 228,904

8 Claims. (Cl. 85—47)

This invention relates to improvements in self-tapping screws.

It is an object of this invention to provide an improved self-tapping screw which may be equipped with standard threads and which has cutting edges formed on the screw without cutting away or in any manner removing the metal of the blank from which the screw is made.

It is a further object of this invention to provide self-tapping screws which are stronger than screws of this type used prior to this invention and which do not have a slot or slots cut deeply into the body thereof.

A further object of this invention is to provide a self-tapping screw which has a groove extending longitudinally, angularly or spirally with respect to the shank of the screw which is depressed into the shank with a displacement of the metal in a particular manner to provide cutting edges along one edge of the groove.

It is a further object of this invention to provide a self-tapping screw which may be manufactured by thread rolling dies of the conventional type, with a very simple and inexpensive addition to such dies which does not increase the cost or procedure of such manufacture.

It is a further object to provide a self-tapping screw which may be made by a single rolling operation without requiring additional handling or processing steps.

It is a further object to provide a novel process for making self-tapping screws by employing thread-rolling dies equipped with one or more groove-forming blades which deform the shank of the screw to provide the self-tapping feature thereof.

It is a further object of this invention to provide simple and inexpensive and yet highly efficient mechanism for use in the production of the screws of this invention.

These and other objects not specifically enumerated are contemplated for this invention as will readily appear to one skilled in the art as the following description proceeds. The disclosure of the invention in this application is given merely by way of example and is not intended to limit the invention in any respect as the scope of the invention is to be determined from the appended claims when given the broadest possible interpretation permitted by the prior art.

Referring to the drawing—

Figure 1 is an enlarged elevational view of a screw constructed in accordance with this invention;

Figure 2 is a cross-sectional view taken through the shank of the screw shown in Figure 1 on the line 2—2 and looking in the direction of the arrows and showing the formation adjacent the edge of the groove somewhat exaggerated so as better to illustrate the characteristics of the invention;

Figure 3 is an enlarged perspective view showing the novel die blocks and the screw blank during the threading and grooving operation;

Figures 4, 5 and 6 are three enlarged cross-sectional views showing a screw blank and the associated die blocks in successive positions during the grooving of the screw blank and showing the results of the die somewhat exaggerated in order better to illustrate the character of the grooving operation.

By referring to the drawing, and particularly to Figure 1, it will be noted that the screw here illustrated comprises a head 10 having a shank 11 equipped with suitable screw threads 12, which are preferably standard threads made by the usual screw rolling dies in accordance with conventional practice. The lower end of the screw is slightly tapered, as shown in Figure 1, to enable it to start its thread-cutting action when it is screwed into an opening. This can be provided in any convenient manner, as, for instance, in accordance with conventional practice by tapering the end of the blank initially prior to the thread rolling operation.

The self-tapping feature of the screw is provided by means of a groove 13 which may extend axially along the shank, angularly with respect thereto or spirally therearound, as shown. This construction is characterized by having the thread edges on one side of the groove, such as the right hand side, represented at 14 in Figure 1, slightly higher than the thread edges on the opposite side 15 of the groove. This construction results from the particular method of making the screws and will be hereinafter more fully explained.

It will be noted, however, that the side or edge of the groove is determined with respect to the character of the threads on the screw, so that as the screw advances into the hole in which it is to be screwed, the cutting edges present themselves at the trailing side of the groove with sharp cutting edges exposed at each thread for performing the self-tapping function.

The groove also provides a space into which the chips cut from the metal or other material may fall in the usual way.

It is apparent that any number of grooves 13 may be provided around the periphery of the screw and this invention contemplates the use of one, two, three or more, according to the necessities of the particular case.

This groove is further characterized in that it is depressed into the metal by a blade which causes the metal to flow in the desired manner, whereby the cutting edge is provided and the necessary shape is given to the shank of the screw without removing any of the original metal of the screw blank. This feature results in the production of a screw which is superior in strength to screws of this type now in use, which usually have slots or cut-away or other deformed or weakened portions.

The configuration of the groove 13 is shown in Figure 2 with an upstanding edge 14, somewhat exaggerated to illustrate the character of the cutting edge. From this figure it will be noted that the edge 14 extends upwardly beyond the normal circumference of the screw shank and that the opposite edge 15 is slightly lower than the edge 14.

By referring to Figure 3 it will be noted that the moving or floating die block 34 has provided on its inner face adjacent its trailing end a blade 40 inset into the face of the die block, preferably at an angle, substantially as shown, and preferably extending from the bottom edge of the die block to a position adjacent the top but preferably below the top edge.

This blade will, of course, vary in dimension, depending on the particular operation and the size of the screws being made, but it is preferable to have the blade extend outwardly beyond the edges of the threads on the die block by approximately one-quarter of the depth of the thread grooves. By way of example, if the thread grooves are .020 of an inch deep the block may extend .005 of an inch outwardly beyond the upper edges of the threads on the block. Furthermore, the width of the blade can vary according to conditions, but it is found to produce a satisfactory groove in the screws when its width is from approximately one-fifth to one-seventh of the outside diameter of the screw being manufactured.

It will also be noted that when the blade is angularly disposed, as shown in Figure 3, it is preferably inclined in a direction to run across the threads, whereby during the rolling operation the groove will be spirally disposed around the shank of the screw. This angular disposition of the blade further minimizes strain and work of the deforming action caused by the blade in any one instant during the passing of the screw blanks over the blade and makes for an advantage on this account. It is apparent, however, that the blade might be vertically disposed so as to make a longitudinal groove in the shank of the screw, or for that matter disposed in any other convenient way.

As shown in Figure 3, as the screw travels with relation to the face of the floating die block 34 the lower end of the screw first engages the blade and, as the screw passes over the blade, the groove is formed progressively from the bottom of the screw upwardly toward the top.

As further shown in Figure 3, the threading grooves on the trailing end of the floating die block 34, that is, on the far side of the blade, are cut away to provide a clearance, so that the particular formation given to the screw by the threads and the blade will not be altered or modified after the screw passes over the blade 40.

The particular character of the action of the blade is illustrated in an exaggerated degree in Figures 4, 5 and 6, where it will be noted the screw blank 50 is shown in successive positions while passing over the blade 40. On account of the direction of movement of the blank 50 it so happens that the flowing of the metal caused by the blade 40 results in a slight enlargement, as at 14, along the edge of the groove which is formed by the initial contact with the blade 40. This edge, which is clearly shown in Figure 2, is the cutting edge of the groove during the self-tapping operation of the screw. This deformation, though slight, is nevertheless definitely present in the screws so made and is quite positive in its self-tapping action.

The illustration of the action which produces this deformation as shown in Figures 4 to 6, inclusive, is crude and is only intended to be representative of the principle involved and is included primarily to show that the edge of the groove which first contacts the blade is, in fact, slightly raised by a flowing of the metal to provide a cutting edge which extends slightly above the opposite edge of the groove.

It will thus be seen that self-tapping screws can be made in accordance with this invention by means of the usual thread-rolling machinery and by the customary operations, it merely being required that the screw threading blocks be constructed to include a suitable groove forming blade 40. If desired two blades 40 may be included, which may be mounted in the same block or one may be mounted in the floating block and one in the stationary block. Also other blades may be provided if three or more grooves are desired.

It is further apparent that the screw of this invention is much stronger than screws of this type heretofore employed because all of the metal of the screw blank is present and no deep cuts or slots are utilized.

Finally, among the other advantages is the advantage that all groove-forming operations as separate steps are eliminated because the groove of the screw of this invention is provided during the thread-rolling operation, with the result that when the screw is rolled through the threading machine it is automatically grooved in the desired way to provide a finished screw which after hardening is ready for use.

I claim:

1. A self-tapping screw, having a shank provided with a thread and a groove extending along said shank across said threads, one edge of said groove being slightly outside the circumference of the threaded shank and the opposite edge thereof being slightly below said first-named edge and said first-named edge constituting a thread-cutting edge for said screw.

2. A self-tapping screw, having a shank, threads on said shank and a groove therein extending across said threads and providing a cutting edge on said threads, said cutting edge on said threads being disposed slightly outside the circumference of said threaded shank and said screw shank containing all of the metal of the screw blank from which it was formed.

3. A self-tapping screw comprising a shank, threads on said shank, a groove extending along said shank and across said threads and flowed metal adjacent one edge of said groove extending outwardly beyond the opposite edge of the said groove and slightly beyond the outside circumference of said threaded shank.

4. A self-tapping screw, having a shank provided with a thread and a groove extending axially along said shank across said threads, one edge of said groove being slightly outside the circumference of the threaded shank and the opposite edge thereof being slightly below said first-named edge and said-first named edge constituting a thread-cutting edge for said screw.

5. A self-tapping screw, having a shank provided with a thread and a groove extending angularly along said shank across said threads, one edge of said groove being slightly outside the circumference of the threaded shank and the opposite edge thereof being slightly below said first-named edge and said first-named edge constituting a thread-cutting edge for said screw.

6. A self-tapping screw, having a shank provided with a thread and a groove extending spirally around said shank across said threads, one edge of said groove being slightly outside the circumference of the threaded shank and the opposite edge thereof being slightly below said first-named edge and said first-named edge constituting a thread-cutting edge for said screw.

7. A self tapping screw having a shank provided with a rolled thread and a groove formed therein by the displacement of metal and extending along said shank across various portions of said thread, said groove being substantially rectangular in cross section and having a flat-bottomed surface extending substantially normally to the radius of said shank passing through the center of said groove at the location of the particular cross section of said groove under consideration, the shank of said screw containing all of the original metal of the blank from which it was made.

8. A self tapping screw having a shank provided with a rolled thread and a single groove formed therein by the displacement of metal and extending along said shank across various portions of said thread, said groove being substantially rectangular in cross section and having a flat-bottomed surface extending substantially normally to the radius of said shank passing through the center of said groove at the location of the particular cross section of said groove under consideration, the shank of said screw containing all of the original metal of the blank from which it was made.

ANDREW J. CHERRY.